(12) United States Patent
Morgan

(10) Patent No.: US 7,570,764 B2
(45) Date of Patent: Aug. 4, 2009

(54) SEQUENCE NUMBER CALCULATION AND AUTHENTICATION IN A COMMUNICATIONS SYSTEM

(75) Inventor: Anne Morgan, Maidenhead (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 885 days.

(21) Appl. No.: 10/176,155

(22) Filed: Jun. 20, 2002

(65) Prior Publication Data

US 2003/0069003 A1    Apr. 10, 2003

Related U.S. Application Data

(60) Provisional application No. 60/328,197, filed on Oct. 10, 2001.

(51) Int. Cl.
H04K 1/00      (2006.01)
H04L 9/00      (2006.01)
G06F 7/58      (2006.01)
H04M 1/66      (2006.01)

(52) U.S. Cl. ............... 380/247; 380/255; 380/259; 380/270; 380/277; 380/44; 713/150; 713/168; 713/171; 726/4; 455/410

(58) Field of Classification Search ......... 713/153–154, 713/160, 171, 182, 200–201; 380/247, 249, 380/255, 200; 455/411

See application file for complete search history.

(56) References Cited

U.S. PATENT DOCUMENTS

| 5,204,902 | A | * | 4/1993 | Reeds et al. ............... 380/248 |
| 5,309,501 | A | * | 5/1994 | Kozik et al. ............... 455/410 |
| 5,345,595 | A | * | 9/1994 | Johnson et al. ............ 455/410 |
| 5,402,490 | A | * | 3/1995 | Mihm, Jr. ................. 380/247 |
| 5,826,017 | A | * | 10/1998 | Holzmann ................ 709/230 |
| 5,918,160 | A | * | 6/1999 | Lysejko et al. ............. 455/74 |
| 5,936,949 | A | * | 8/1999 | Pasternak et al. .......... 370/328 |
| 6,058,106 | A | * | 5/2000 | Cudak et al. ............... 370/313 |
| 6,201,811 | B1 | * | 3/2001 | Larsson et al. ........... 370/310.1 |
| 6,208,627 | B1 | * | 3/2001 | Menon et al. .............. 370/328 |
| 6,378,073 | B1 | * | 4/2002 | Davis et al. .................. 726/1 |
| 6,577,643 | B1 | * | 6/2003 | Rai et al. .................... 370/466 |
| 6,594,481 | B1 | * | 7/2003 | Johnson et al. ........... 455/410 |

(Continued)

OTHER PUBLICATIONS

Berg et al, Jun. 4, 1998, UMTS—Universal Mobile Telecommunications System, p. 1-11.*

(Continued)

*Primary Examiner*—Ayaz R Sheikh
*Assistant Examiner*—Aravind K Moorthy
(74) *Attorney, Agent, or Firm*—Barnes & Thornburg LLP

(57) ABSTRACT

In a mobile communications system, a batch of sequence numbers is generated via an algorithm wherein each sequence number comprises a suffix and a prefix. The method comprises; calculating a new sequence number suffix from an existing sequence number suffix, calculating a prefix of a first new sequence number of the batch by addition to the prefix of the existing sequence number if the new suffix is not equal to a predetermined value or by a randomizing process if the new suffix is equal to said predetermined value, and calculating prefixes for the other sequence numbers of the batch by modular addition of integers to the prefix of said first new sequence number. The sequence numbers are used in the authentication procedure.

8 Claims, 3 Drawing Sheets

U.S. PATENT DOCUMENTS

| | | | |
|---|---|---|---|
| 6,668,166 B1 * | 12/2003 | Kanabar | 455/411 |
| 6,745,326 B1 * | 6/2004 | Wary | 713/168 |
| 6,751,205 B2 * | 6/2004 | Menon et al. | 370/328 |
| 6,853,729 B1 * | 2/2005 | Mizikovsky | 380/249 |
| 6,876,747 B1 * | 4/2005 | Faccin et al. | 380/247 |
| 6,950,521 B1 * | 9/2005 | Marcovici et al. | 380/249 |
| 7,194,760 B2 * | 3/2007 | Nordman et al. | 726/5 |
| 7,302,565 B2 * | 11/2007 | Meandzija et al. | 713/155 |
| 2004/0264699 A1 * | 12/2004 | Meandzija et al. | 380/270 |
| 2007/0105530 A1 * | 5/2007 | Wang | 455/411 |

OTHER PUBLICATIONS

Poovendran et al, A graph theoretic framework for preventing the wormhole attack in wireless ad hoc networks, 2006, ACM, pp. 27-59.*

Mathur et al, Radio-telepathy: Extracting a Secret Key from an Unauthenticated Wireless Channel, 2008, ACM, pp. 128-139.*

Singh et al, A Minimal Protocol for Authenticated Key Distribution in Wireless Sensor Networks, 2006, IEEE, pp. 78-83.*

Barakat et al, Hybrid secure random key pre-distribution scheme for wireless sensor networks, 2007, IEEE, pp. 151-157.*

* cited by examiner

Note:
x is the number of SQN requested by the AuC. x is also the number of authentication quintet requested by VLR/SGSN in the SAI v.3.

Start:

Generation of new IND:

IND = INDhe + 1 mod 32

Generation of new SEQ:

if 0 < IND ≤ 31, then SEQ = SEQhe + 1

- if IND = 0, then new SEQ is generated using strictly the random rules described in C.1.1.1

SQNs used in the batch of Authentication vectors:

within a batch, the 5 SQNs shall be as follows:

. SEQ  || IND

. SEQ+1 || IND

. SEQ+2 || IND

. SEQ+3 || IND

. SEQ+5 || IND

End:

*Fig.3*

SEQUENCE NUMBER CALCULATION AND AUTHENTICATION IN A COMMUNICATIONS SYSTEM

RELATED APPLICATION

This application is the regular filing of provisional patent application No. 60/328,197 filed Oct. 10, 2001, the contents of which are incorporated herein by reference.

FIELD OF THE INVENTION

The present invention relates to a method and apparatus for authenticating subscriber handsets in a mobile communications system, and a system incorporating the same.

BACKGROUND TO THE INVENTION

The introduction of mobile communications systems in which subscribers access the system on demand via a wireless link has introduced the attendant need for authentication procedures to ensure that a handset is genuine and that the user is entitled to use the system facilities. There is also a need for system security to prevent 'eavesdropping' of the wireless signals e.g. to prevent theft of a subscriber identity and subsequent fraudulent use of the system.

The proliferation of wireless communications systems and the introduction of third generation (3G) networks, also referred to as the Universal Mobile Telecommunications System (UMTS), has increased the system security requirements. These requirements include not only the authentication by the network that the mobile is entitled to access the network, but also an authentication by the mobile that the network to which it is trying to connect is authorised to deliver the services as defined by the mobile user's service provider. Part of this authentication procedure involves the exchange between the mobile and the network of secret key information known only to the network and that particular mobile. As an additional security feature, this key information is changed each time the mobile accesses the network. This process requires the calculation of sequence numbers which are used to construct authentication vectors.

A description of the security architecture for the Universal Mobile Telecommunications System is given in publicly available standards documents ETSI TS 133.102 v.3.1 and v.3.9, the contents of which are incorporated herein by reference.

Network security is an issue that is currently under review, and the relevant standards are thus continually evolving. As a consequence, it has been found that the currently established methods of sequence number generation are less than optimum and are not fully compatible with the more recent standards, nor with the commonly used Supercharger functionality.

OBJECT OF THE INVENTION

The invention seeks to provide an improved method and apparatus for sequence number generation in a communications system.

The invention also seeks to provide an improved method and apparatus for subscriber and network authentication in a communications system.

A further object of the invention is to provide an improved method and apparatus for generating authentication vectors in a communications system.

SUMMARY OF THE INVENTION

According to a first aspect of the invention there is provided a method of sequence number generation in a communications system wherein each sequence number comprises a suffix and a prefix, the method comprising calculating a new sequence number suffix from an existing sequence number suffix, calculating a new sequence number prefix by a randomising process if the new suffix is equal to a predetermined value, and calculating a new sequence number prefix by an algorithmic process from the prefix of the existing sequence number if the new suffix differs from said predetermined value.

Preferably, the algorithmic process comprises modular addition of an integer, e.g. unity, to the prefix of the existing sequence number.

According to another aspect of the invention there is provided a method of sequence number generation in a communications system wherein each sequence number comprises a suffix and a prefix, the method comprising; calculating a new sequence number suffix from an existing sequence number suffix, calculating a new sequence number prefix by addition to the prefix of the existing sequence number if the new suffix is non-zero, and calculating a new sequence number prefix by a randomising process if the new suffix is equal to zero.

According to another aspect of the invention there is provided a method of generating a batch of sequence numbers in a communications system wherein each sequence number comprises a suffix and a prefix, the method comprising; calculating a new sequence number suffix from an existing sequence number suffix, calculating a prefix of a first new sequence number of the batch by addition to the prefix of the existing sequence number if the new suffix is not equal to a predetermined value or by a randomising process if the new suffix is equal to said predetermined value, and calculating prefixes for the other sequence numbers of the batch by modular addition of integers to the prefix of said first new sequence number.

Advantageously, the sequence number calculation is performed by a home location register (HLR) associated with the communications system.

In a further step, batches of calculated sequence numbers may be used for the construction of a corresponding set of authentication vectors.

The invention is also directed to a method by which the described apparatus operates and including method steps for carrying out every function of the apparatus.

The method is compatible with current and previous general validation rules. It also introduces an element of randomness thus increasing the level of security. It also optimises the generation of sequence numbers in real time.

Advantageously, the communications system comprises a third generation (3G) mobile communications system.

The invention also provides for an authentication centre constructed to perform the method of sequence number calculation and to determine sets of authentication vectors from the calculated sequence numbers.

The invention further provides for a method of authentication in a communications system using the calculated sequence numbers and authentication vectors.

The invention also provides for a system for the purposes of communications which comprises one or more instances of apparatus embodying the present invention, together with other additional apparatus.

The invention also provides for computer software in a machine-readable form and arranged, in operation, to carry out every function of the apparatus and/or methods.

The preferred features may be combined as appropriate, as would be apparent to a skilled person, and may be combined with any of the aspects of the invention.

BRIEF DESCRIPTION OF THE DRAWINGS

In order to show how the invention may be carried into effect, an embodiment of the invention and the best known method of performing the invention are now described below by way of example only and with reference to the accompanying figures in which:

FIG. 3 illustrates the algorithm employed in the sequence number generation process of FIG. 2.

DESCRIPTION OF PREFERRED EMBODIMENT

Figure 1:
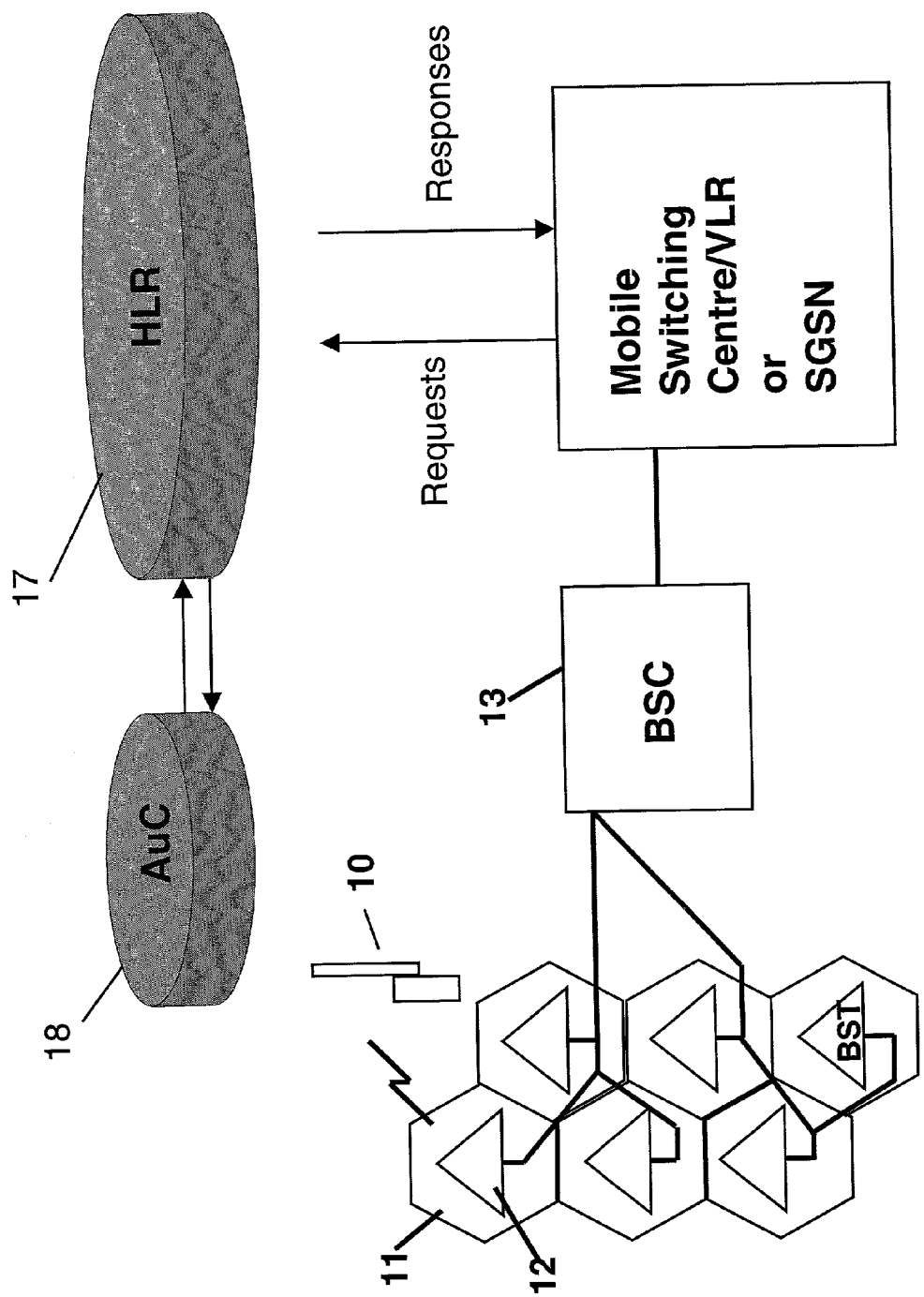
FIG. 1 shows a mobile communications system in schematic form.

Referring to FIG. 1, which is introduced for comparative and explanatory purposes, there is depicted in highly schematic form part of a mobile cellular communications network or system. The service area of the system is subdivided into a plurality of contiguous cells 11 in each of which mobile terminals 10 are serviced via a respective base station (BST) 12. Operation of a group of base stations 12 is controlled via a base station controller (BSC) 13 and, in turn, a number of base station controllers are serviced by a mobile switching centre/visitors location register (MSC/VLR) or a serving GPRS support node (SGSN) 14 which may provide an interface to the public telecommunications network (not shown). Within this arrangement, the SGSN 14 may service, via the base station controllers 13 and the base stations 12, typically over one hundred individual cells 11. Information relating to the mobiles 10 that are currently located within the service area of the mobile switching centre 14 is stored at the SGSN 14. For clarity, FIG. 1 depicts only one SGSN, but it will be appreciated that the system will incorporate a number of SGSNs each servicing its respective zone.

Information relating to the system subscribers is held on a home location register (HLR) 17. In particular, the HLR stores and updates authentication information for the exchange of secret key information between the network and a mobile accessing the system. Part of this authentication information is the generation of the sequence number (SQN), which is recalculated each time a mobile accesses the network. The sequence numbers are used by authentication centre (AuC) 18 to calculate authentication vectors which are used for verification purposes in the secret information exchange process. Typically, the authentication centre calculates a batch of authentication vectors for use by the home location register.

Figure 2:
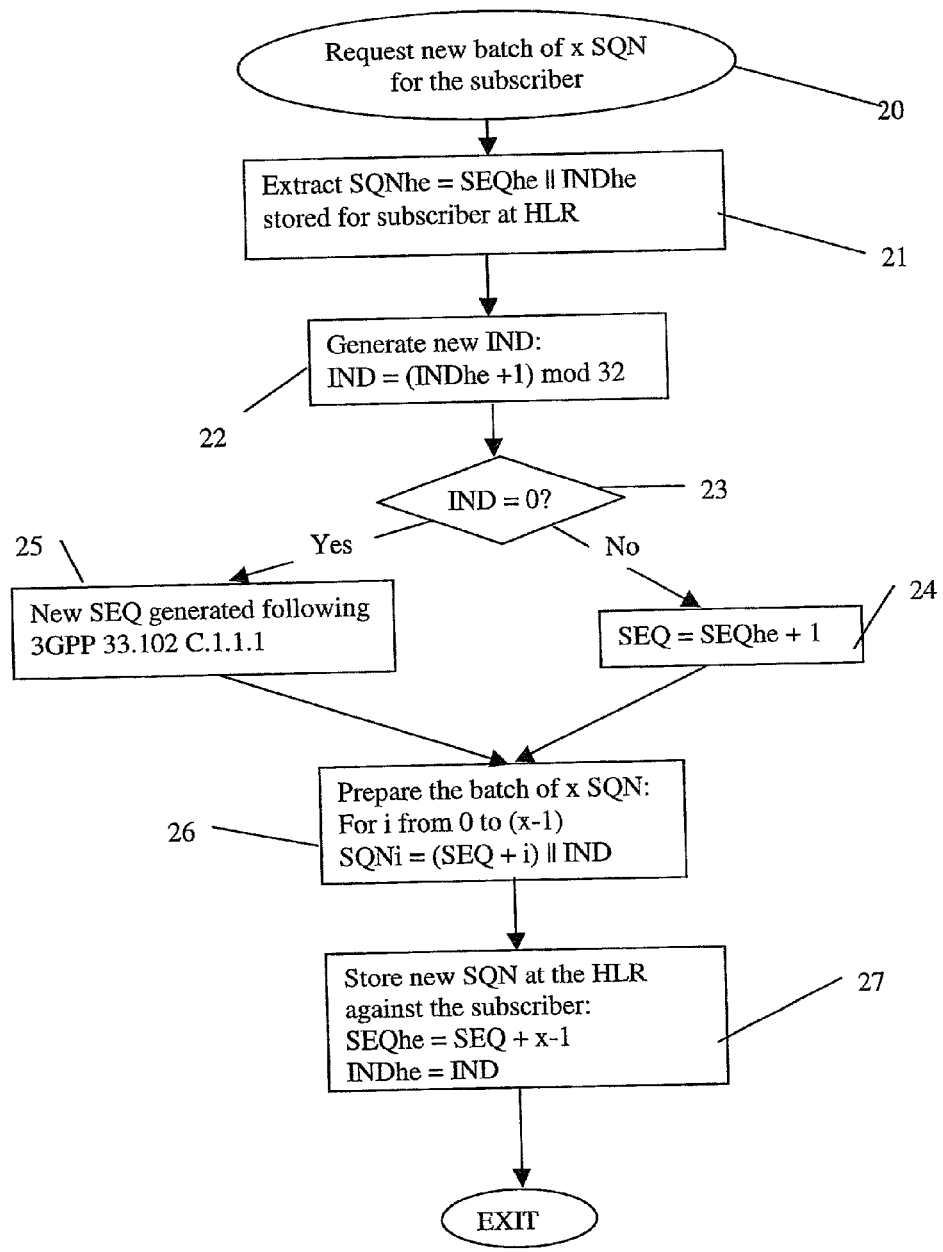
FIG. 2 is a flow diagram illustrating a method according to the invention for sequence number generation in a mobile communications system.

Referring now to FIG. 2, this illustrates a method of sequence number generation according to a preferred embodiment of the invention. In this method, a new sequence number is generated from an existing sequence number SQNhe) stored on the home location register. FIG. 3 shows the algorithm in programme form.

The sequence number (SQN) is composed of two concatenated parts. The last five digits are referred to as the index (IND) and the preceding digits are referred to as the prefix (SEQ). The generated sequence number is thus of the form

SQN=SEQ II IND

Where II denotes concatenation.

As can be seen from FIG. 2, the sequence number generation process commences (step 20) with a request for a new batch of sequence numbers for the subscriber. In step 21, the sequence number SQNhe stored for the subscriber at the HLR is extracted.

The sequence number generation proceeds at step 22 with the generation of a new index number (IND) from the corresponding stored number (INDhe) by modular addition of an integer value, e.g. unity.

$IND=INDhe+1 \bmod 32$

Next, in step 23, the value IND is compared with zero (mod 32), and in steps 24 or 25 the value of a new prefix (SEQ) is generated.

If $0<IND\leq31$, then $SEQ=SEQhe+1$

If IND=0, generate SEQ using random rules

The random rules in step 24 may be those described in ETSI document TS 133 102 V3.8.0 (2001-3) Section C.1.1.1.

In step 26, a batch of sequence numbers is calculated for subsequent use in the generation of authentication vectors by modular addition of integer values to the first calculated prefix SEQ, $SQN_1=SEQ$ II IND $SQN_2=SEQ+1$ II IND $SQN_3=SEQ+2$ II IND $SQN_4=SEQ+3$ II IND $SQN_5=SEQ+4$ II IND The process is completed at step 27 by storage of the new prefix (SEQ) and index (IND) numbers at the HLR against the subscriber to which they relate.

It will be appreciated that although the technique has been described above with particular reference to wireless communication systems, it is also applicable to systems which are accessed by users over wired or optical connections.

It will be understood that the above description of a preferred embodiment is given by way of example only and that various modifications may be made by those skilled in the art without departing from the spirit and scope of the invention.

The invention claimed is:

1. A method of authenticating access of a subscriber terminal to a communication network, comprising:

storing in a communication network database authentication information for said subscriber terminal for exchanging secret key information between said subscriber terminal and said communication network when said subscriber terminal accesses the communication network, said authentication information comprising a sequence number which is recalculated each time the subscriber terminal accesses the communication network;

recalculating the sequence number by generating a new sequence number from a sequence number for the subscriber terminal stored in the communication network database and wherein each sequence number comprises a suffix and a prefix, the method of generating a new sequence number comprising calculating a new sequence number suffix from an existing sequence number suffix, calculating a new sequence number prefix by a randomising process if the new suffix is equal to a predetermined value, and calculating a new sequence number prefix by an algorithmic process from the prefix of the existing sequence number if the new suffix differs from said predetermined value;

exchanging secret key information between said subscriber terminal and said communication network using said recalculated sequence number; and based on said exchanged secret key information, authenticating access of said subscriber terminal to the communications network.

2. A method as claimed in claim 1 wherein the algorithmic process comprises modular addition of an integer to the prefix of the existing sequence number.

3. A method as claimed in claim 2, wherein the integer comprises unity.

4. A method of authenticating access of a subscriber terminal to a communication network, comprising:

storing in a communication network database authentication information for said subscriber terminal for exchanging secret key information between said subscriber terminal and said communication network when said subscriber terminal accesses the communication network, said authentication information comprising a sequence number which is recalculated each time the subscriber terminal accesses the communication network;

recalculating the sequence number by generating a new sequence number from a sequence number for the subscriber terminal stored in the communication network database and wherein each sequence number comprises a suffix and a prefix, the method of generating a new sequence number comprising; calculating a new sequence number suffix from an existing sequence number suffix, calculating a new sequence number prefix by addition to the prefix of the existing sequence number if the new suffix is non-zero, and calculating a new sequence number prefix by a randomising process if the new suffix is equal to zero;

exchanging secret key information between said subscriber terminal and said communication network using said recalculated sequence number; and based on said exchanged secret key information, authenticating access of said subscriber terminal to the communications network.

5. A method of authenticating access of a subscriber terminal to a communication network, comprising:

storing in a communication network database authentication information for said subscriber terminal for exchanging secret key information between said subscriber terminal and said communication network when said subscriber terminal accesses the communication network, said authentication information comprising a sequence number from a batch of sequence numbers which is recalculated each time the subscriber terminal accesses the communication network;

recalculating the sequence number by generating a new sequence number from a sequence number for the subscriber terminal stored in the communication network database and wherein each sequence number comprises a suffix and a prefix, the method of generating a new sequence number comprising; calculating a new sequence number suffix from an existing sequence number suffix, calculating a prefix of a first new sequence number of the batch by addition to the prefix of the existing sequence number if the new suffix is not equal to a predetermined value or by a randomising process if the new suffix is equal to said predetermined value, and calculating prefixes for the other sequence numbers of the batch by modular addition of integers to the prefix of said first new sequence number;

exchanging secret key information between said subscriber terminal and said communication network using said recalculated sequence number; and based on said exchanged secret key information, authenticating access of said subscriber terminal to the communications network.

6. A system for authenticating access of a subscriber terminal to a communication network, said system comprising:

a communication network database storing authentication information for said subscriber terminal for exchanging secret key information between said subscriber terminal and said communication network when said subscriber terminal accesses the communication network, said authentication information comprising a set of authentication vectors constructed from a batch of sequence numbers generated by a sequence number generation system in said communications network wherein each sequence number comprises a suffix and a prefix, said sequence number generation system comprising:

means for generating a batch of sequence numbers in a communications system wherein each sequence number comprises a suffix and a prefix;

means for calculating a new sequence number suffix from an existing sequence number suffix;

means for calculating a prefix of a first new sequence number of the batch by addition to the prefix of the existing sequence number if the new suffix is not equal to a predetermined value or by a randomising process if the new suffix is equal to said predetermined value;

means for calculating prefixes for the other sequence numbers of the batch by modular addition of integers to the prefix of said first new sequence number;

means for exchanging secret key information between said subscriber terminal and said communication network using said recalculated sequence number; and means for authentications access of said subscriber terminal to the communications network based on said exchanged secret key information.

7. A home location register arranged to authenticate access of a subscriber terminal to a communication network, said home location register having a database for storing authentication information for said subscriber terminal for exchanging secret key information between said subscriber terminal and said communication network when said subscriber terminal accesses the communication network, said authentication information comprising a sequence number which is recalculated each time the subscriber terminal accesses the communication network; the home location register being arranged to recalculate the sequence number by generating a new sequence number from a sequence number for the subscriber terminal stored in the communication network database and wherein each sequence number comprises a suffix and a prefix, the home location register comprising:

means for calculating a new sequence number suffix from an existing sequence number suffix means for calculating a new sequence number prefix by a randomising process if the new suffix is equal to a predetermined value;

means for calculating a new sequence number prefix by an algorithmic process from the prefix of the existing sequence number if the new suffix differs from said predetermined value means for exchanging secret key information between said subscriber terminal and said communication network using said recalculated sequence number; and means for authenticating access of said subscriber terminal to the communications network based on said exchanged secret key information.

8. A mobile handset arranged to respond to an authentication signal incorporating a set of authentication vectors constructed from a batch of sequence numbers generated by a system in a communications system wherein each sequence number comprises a suffix and a prefix, said sequence number generation system comprising:

means for generating a batch of sequence numbers in a communications system wherein each sequence number comprises a suffix and a prefix;

means for calculating a new sequence number suffix from an existing sequence number suffix;

means for calculating a prefix of a first new sequence number of the batch by addition to the prefix of the existing sequence number if the new suffix is not equal to a predetermined value or by a randomising process if the new suffix is equal to said predetermined value;

means for calculating prefixes for the other sequence numbers of the batch by modular addition of integers to the prefix of said first new sequence number; and means for exchanging secret key information with said communication network using said recalculated sequence number.

\* \* \* \* \*